United States Patent
Jones et al.

(10) Patent No.: US 7,689,554 B2
(45) Date of Patent: Mar. 30, 2010

(54) SYSTEM AND METHOD FOR IDENTIFYING RELATED QUERIES FOR LANGUAGES WITH MULTIPLE WRITING SYSTEMS

(75) Inventors: Rosie Jones, Pasadena, CA (US); Kevin Bartz, Pasadena, CA (US); Benjamin Rey, Santa Monica, CA (US)

(73) Assignee: Yahoo! Inc., Sunnyvale, CA (US)

( * ) Notice: Subject to any disclaimer, the term of this patent is extended or adjusted under 35 U.S.C. 154(b) by 495 days.

(21) Appl. No.: 11/365,315

(22) Filed: Feb. 28, 2006

(65) Prior Publication Data

US 2007/0203894 A1    Aug. 30, 2007

(51) Int. Cl.
*G06F 7/00* (2006.01)
*G06F 17/30* (2006.01)

(52) U.S. Cl. .................... 707/4; 707/5; 707/6
(58) Field of Classification Search .......... 707/3, 707/4, 5, 6
See application file for complete search history.

(56) References Cited

U.S. PATENT DOCUMENTS

| | | | | |
|---|---|---|---|---|
| 4,833,610 A | * | 5/1989 | Zamora et al. | 707/5 |
| 2004/0260681 A1 | * | 12/2004 | Dvorak | 707/3 |
| 2005/0119875 A1 | * | 6/2005 | Shaefer et al. | 704/7 |
| 2006/0106769 A1 | * | 5/2006 | Gibbs | 707/3 |

OTHER PUBLICATIONS

Bilac, Slaven et al. "Direct Combination of Spelling and Pronunciation Information for Robust Back-Transliteration," Computational Linguistics and Intelligent Text Processing, 2005, Springer Berlin/Heidelberg, Lecture Notes in Computer Science, vol. 3406/2005, ISBN 978-3-540-24523-0, pp. 413-424.*

* cited by examiner

*Primary Examiner*—Mohammad Ali
*Assistant Examiner*—Angelica Ruiz
(74) *Attorney, Agent, or Firm*—Seth H. Ostrow; Ostrow Kaufman & Frankl LLP

(57) ABSTRACT

The present invention relates to systems and methods for identifying one or more queries related to a given query. The method of the present invention comprises receiving a query written according to one or more writing systems of a language with multiple writing systems. A candidate set of queries written according to one or more writing systems of the language with multiple writing systems is identified. A score is calculated for the one or more queries in the candidate set indicating the similarity of the one or more queries with respect to the query received.

36 Claims, 11 Drawing Sheets

# SYSTEM AND METHOD FOR IDENTIFYING RELATED QUERIES FOR LANGUAGES WITH MULTIPLE WRITING SYSTEMS

CROSS REFERENCE TO RELATED APPLICATIONS

This application is related to the following pending applications, each of which is hereby incorporated herein by reference in its entirety:

U.S. patent application Ser. No. 11/200,851, entitled "SYSTEM AND METHOD FOR DETERMINING ALTERNATE SEARCH QUERIES," filed Aug. 10, 2005; and U.S. Provisional Application No. 60/736,133, entitled "MODULAR OPTIMIZED DYNAMIC SETS," filed Nov. 9, 2005.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The present invention generally provides methods and systems for identifying one or more queries related to a given search query written according to a language with multiple writing systems. More specifically, the present invention provides methods and systems for receiving a search query written according to combinations of one or more writings systems of a language with multiple writings systems and identifying one or more related queries from a candidate set of queries.

With the advent of the Internet and the multitude of web pages, media content, advertisements, etc., available to a user over the World Wide Web ("the web"), there has become a need to provide users with streamlined approaches to obtain relevant information from the web. Search systems and processes have been developed to meet the needs of users to obtain such information. Examples of such technologies can be accessed through Yahoo!, Google and other search provider web sites.

Currently, users may employ client devices (such as personal computers (PCs), PDA's, smartphones, etc.) with access to wide area networks, e.g., the Internet, to search for and retrieve content. Typically, a user inputs a query via a client device and a search process returns one or more items of content, such as links, documents, web pages, advertisements, etc., related to the query. The items of content returned in response to a given query may be closely related or entirely unrelated to the subject or topic that the user was actually seeking. The success of a given search, which may be measured based upon how closely related the items of content retrieved are to a given query, may depend significantly upon the proper interpretation of a search query.

A query is made up of one or more words and phrases. Queries entered by human users, however, often fail to adequately describe the content that a given user may be seeking. Moreover, users may have only a general or vague idea of the content they may be seeking. For example, a user may wish to conduct a search, using the Yahoo! search engine, for a product advertised on television. The user may not know the name of the product, the manufacturer, etc., and may only be able to generally describe the product. Therefore, the query formulated by the user may be too broad, resulting in the retrieval of content items entirely unrelated to the content sought by the user. Similarly, the query terms selected by the user may fail to adequately describe the product, resulting in the retrieval of few if any content items.

Current techniques are known for generating a candidate set of queries that may be related to a given query. For example, a user may enter the query "Apple® MP3 player" and be presented with one or more related queries, such as "IPOD®," "Itunes®," etc. Search providers, however, are presented with the challenge of identifying one or more queries from a candidate set of queries that are the most relevant or closely related in meaning to a given query. Moreover, certain languages such as Japanese have multiple writing systems, which further increases the complexity of identifying queries from a candidate set of queries that are the most relevant or similar in meaning to given query. For example, a single Japanese query submitted to a search engine may be written according to varying combinations of one or more Japanese writing systems, such as Kanji, Katakana, Hiragana, JASCII, ASCII, etc. A query written according to the Japanese Kanji writing system may look entirely different than a query written according to the Japanese Katakana and Hiragana writing systems, however, the two queries may have very similar or identical meanings.

Additionally, search providers, such as Yahoo!, MSN, or Google may utilize a bidding marketplace whereby advertisers may bid upon terms in order to have one or more advertisements displayed in response to a query. For example, one or more advertisers may wish to display one or more advertisements for laptop computers and accordingly may bid upon the terms "notebook computer." The terms "notebook computer," however, may be written according to one or more writing systems of a language with multiple writing systems, such as Japanese. For example, the terms "notebook computer" may be written according to the Japanese Hiragana writing system, the Japanese Katakana writing system, etc.

A user may submit a query comprising the terms "notebook computer" to a given search provider, such as Yahoo!, written according to the Japanese Katakana writing system. The one or more advertisements with associated bids for the Katakana terms "notebook computer" may be retrieved and displayed to the user. In a bidding marketplace, the advertisement associated with the advertiser that provided the greatest bid for the Katakana terms "notebook computer" may be displayed in the most prominent position of a web page, e.g., ranked first in a ranked list of advertisements, displayed at the top of a given search results page, etc.

If the user selects one or more of the advertisements displayed, the search provider may monetize the selection of the user, such as by charging the advertiser associated with the advertisement selected an amount of money based upon the advertiser's bid. Retrieving and displaying only the advertisements that have associated bids for one or more terms, however, may result in a significant loss of revenue to a given search provider. For example, if a user enters a query comprised of terms that have not been bid upon by one or more advertisers, the search provider may fail to return any advertisements to the user, resulting in a loss of revenue to the search provider as the user will be unable to select any results. With reference to the abovementioned example, if the query entered by the user did not comprise the Katakana terms "notebook computer," but instead comprised the Hiragana terms "laptop computer," the search provider may not display properly targeted advertisements despite the similarity in meaning of the Katakana query "laptop computer" and the Hiragana query "notebook computer."

While techniques exist for identifying one or more queries from a candidate set of queries that are identical or similar in meaning to a given query, existing techniques are limited to languages written according to a single writing system. Current techniques thus fail to provide for the identification of queries that are most relevant or closely related in meaning to an original query that is written according to one or more writing systems of a language with multiple writing systems. In order to overcome shortcomings associated with existing techniques, the present invention provides systems and methods for identifying one or more queries from a candidate set of related queries that are the most similar in meaning with respect to a given search query, written according to one or more writing systems of a language with multiple writing systems.

SUMMARY OF THE INVENTION

The present invention is directed towards methods and systems for identifying one or more queries related to a given query. The method of the present invention comprises receiving a query written according to one or more writing systems of a language with multiple writing systems. According to one embodiment of the invention, the query received comprises a query written according to a combination of one or more Japanese writing systems, including the Japanese Hiragana, Katakana, Kana, Romaji, JASCII, and Kanji writing systems.

A candidate set of queries written according to one or more writing systems of the language with multiple writing systems associated with the query received is identified. According to one embodiment of the invention, the candidate set of queries comprises one or more queries related to the query received as indicated in one or more query logs.

The method further comprises calculating a score for the one or more queries in the candidate set indicating the similarity of the one or more queries with respect to the query received. The score calculated for the one or more queries in the candidate set indicates the similarity in meaning of a given query from the candidate set with respect to the received query. According to one embodiment of the invention, calculating a score comprises calculating a character edit distance between the received query and a query selected from the candidate set after converting the one or more characters in each query to Roman characters. According to another embodiment of the invention, calculating a score comprises calculating a character edit distance between the received query and a query selected from the candidate set after converting the one or more characters in each query to Roman characters and removing space characters from each query. According to a further embodiment of the invention, calculating a score comprises converting the characters of the query received and a query selected from the candidate set to Roman characters, and calculating the difference between one ("1") and the quotient of the number of unique space-separated co-occurring words in the received query and the selected query and the total number of unique space-separated words in both queries.

According to yet another embodiment of the invention, calculating a score comprises identifying whether a digit is unique to the received query and a query selected from the candidate set. According to a further embodiment, calculating a score comprises calculating a difference between the value one ("1") and quotient of the number of co-occurring Japanese Kanji characters in the received query and a selected query from the candidate set, and the total number of unique Japanese Kanji characters in the received query and the selected query from candidate set. According to another embodiment of the invention, calculating a score comprises converting the one or more characters of the received query and a query selected from the candidate set to Roman characters and calculating a number of Roman characters the queries have in common. According to yet another embodiment of the invention, calculating a score comprises identifying whether either the received query or a selected query from the candidate set contain a non-Roman character. According to yet another embodiment of the invention, calculating a score comprises calculating a character edit distance between the received query and a selected query from the candidate set after converting the Japanese Kanji characters of each query to Japanese Kana characters and removing all non-Japanese characters from each query. According to a further embodiment, calculating a score comprises calculating a quotient of the frequency with which a selected query from the candidate set follows the received query in one or more query logs and the frequency of the received query in the one or more query logs.

The method further comprises selecting one or more of the queries from the candidate set for distribution. According to one embodiment of the invention, the one or more queries selected from the candidate set for distribution comprise queries with scores exceeding a given threshold. The one or more queries selected for distribution may be distributed. According to one embodiment of the invention, the queries selected for distribution are embedded in one or more web pages.

The invention is also directed towards a system for identifying one or more queries related to a given query. The system of the present invention comprises a search engine operative to receive a query written according to one or more writing systems of a language with multiple writing systems. According to one embodiment of the invention, the search engine is operative to receive a query written according to one or more Japanese writing systems. The search engine is further operative to identify a candidate set of one or more queries written according to one or more writing systems of the language with multiple writing systems associated with the query received. According to one embodiment of the invention, the search engine is operative to identify a candidate set comprised of one or more queries related to the received query as indicated in one or more query logs.

A conversion component is operative to convert the received query and the one or more queries in the candidate set into one or more written formats. According to one embodiment of the invention, the conversion component is operative to convert a query into one or more written formats in accordance with one or more writing systems.

A similarity component is operative to calculate a score for the one or more queries in the candidate set indicating the similarity of the one or more queries with respect to the received query. The similarity component is operative to calculate a score indicating the similarity in meaning of a selected query from the candidate set with respect to the received query. According to one embodiment of the invention, the similarity component is operative to calculate a character edit distance between the received query and a selected query from the candidate set. According to further embodiment of the invention, the similarity component is operative to calculate a difference between one ("1") and the quotient of the number of unique space-separated co-occurring words in the received query and a query selected from the candidate set, and the total number of unique space-separated words in both queries. According to yet another embodiment of the invention, the similarity component is operative to identify whether a digit is unique to the received query or a selected query from the candidate set.

According to another embodiment, the similarity component is operative to calculate a difference between one ("1") and the quotient of the number of co-occurring Japanese Kanji characters in the received query and a query selected from the candidate set, and the total number of unique Japanese Kanji characters in the both queries. According to a further embodiment of the invention, the similarity component is operative to calculate a number of characters the received query and a selected query from the candidate set have in common. According to yet another embodiment of the invention, the similarity component is operative identify whether the received query or a selected query from the candidate set contain one or more characters of a given writing system. According to a further embodiment, the similarity component is operative to calculate a quotient of the frequency with which a selected query from the candidate set follows the received query in one or more query logs and the frequency of the received query in the query logs.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENT

In the following description, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

Figure 1:
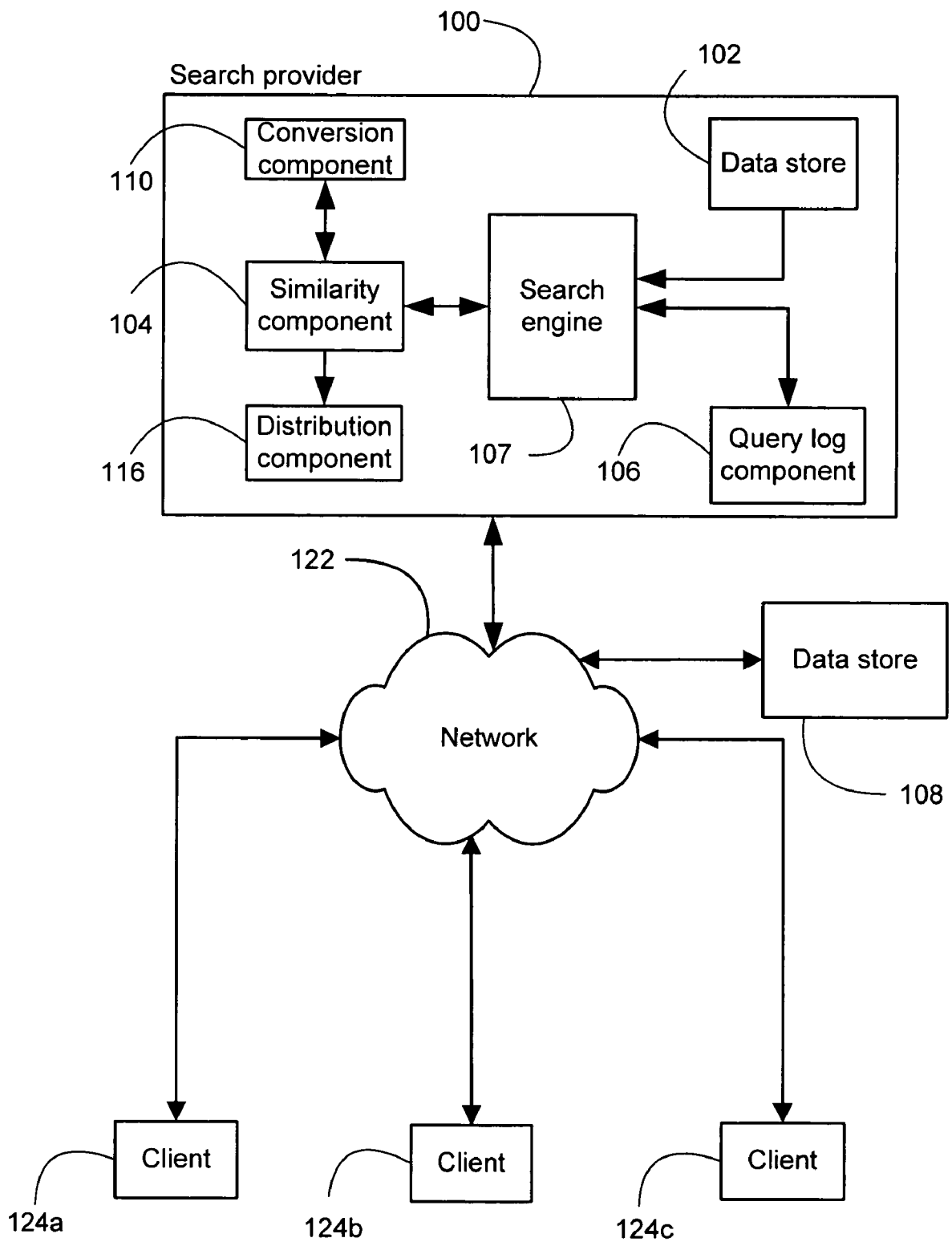
FIG. 1 is a block diagram presenting a system for identifying one or more related queries written in accordance with combinations of one or more writing systems of a language with multiple writing systems, according to one embodiment of the present invention.

FIG. 1 presents a block diagram depicting one embodiment of a system for identifying one or more queries related to a given query written according to one or more writing systems of a language with multiple writing systems. According to the embodiment of FIG. 1, client devices 124*a*, 124*b* and 124*c* are communicatively coupled to a network 122, which may include a connection to one or more local and/or wide area networks, such as the Internet. According to one embodiment of the invention, a client device 124*a*, 124*b* and 124*c* is a general purpose personal computer comprising a processor, transient and persistent storage devices, input/output subsystem and bus to provide a communications path between components comprising the general purpose personal computer. For example, a 3.5 GHz Pentium 4 personal computer with 512 MB of RAM, 40 GB of hard drive storage space and an Ethernet interface to a network. Other client devices are considered to fall within the scope of the present invention including, but not limited to, hand held devices, set top terminals, mobile handsets, PDAs, etc.

Users of client devices 124*a*, 124*b* and 124*c* communicatively coupled to the network 122 may submit search queries, comprising one or more terms, to the search provider 100. A search query submitted by a user via the network 122 to the search provider 100 may comprise one or more characters, terms, or phrases written according to one or more writing systems of a language with multiple writing systems. For example, users of client devices 124*a*, 124*b*, and 124*c* may formulate queries comprising Japanese Kanji characters, Japanese Katakana characters and JASCII characters. Similarly, users of client devices 124*a*, 124*b* and 124*c* may formulate queries comprising Japanese Romaji characters, Japanese Hiragana characters, and digits. For example, a user may submit the following query, written according to a combination of the Japanese Katakana, Hiragana, Kanji and ASCII writing systems: 1リットルの涙沢尻エリカ.

The one or more search queries submitted by users of client devices 124a, 124b, and 124c, which may comprise characters and terms written according to one or more writing systems of a language with multiple writing systems, may be used by the search engine 107 at the search provider 100 to identify a candidate set of related queries. The one or more queries comprising the candidate set of related queries may be maintained in one or more local or remote data stores 102 and 108, respectively, which are operative to maintain one or more queries that may be related to a given query. According to one embodiment of the invention, data stores 102 and 108 are operative to maintain indices with entries identifying a set of queries related to one or more queries or terms. The indices maintained by data stores 102 and 108 may be supplemented with human editorial information indicating terms or queries that are related. For example, an index entry in data stores 102 and 108 may comprise the query "1リットルの涙 沢尻エリカ" written in accordance with the Japanese Katakana, Hiragana, Kanji, and ASCII writing systems, and one or more related queries or terms written in accordance with one or more Japanese writing systems.

Data stores 102 and 108 may be implemented as databases or any other type of storage structures capable of providing for the retrieval and storage of one or more sets of queries, such as a database, CD-ROM, tape, digital storage library, etc. The queries maintained in data stores 102 and 108 may comprise queries written according to one or more writing systems of a given language with multiple writing systems. For example, the queries maintained in data stores 102 and 108 may comprise queries written in accordance with the Japanese Kanji, Hiragana, Katakana, JASCII, and Romaji writing systems.

According to another embodiment of the present invention, a candidate set of related queries identified by the search engine 107 comprises one or more sequential pairs of queries that co-occur with statistical significance in one or more query logs. The search engine 107 may utilize query logs to identify a candidate set comprising one or more queries related to a query received from a client device 124a, 124b, and 124c. The plurality of queries submitted by users to the search provider 100, which may be written according to one or more writing systems of a language with multiple writing systems, may be maintained in a query log component 106. The query log component 106 may be implemented as a database or similar storage structure capable of providing for the storage of one or more queries written according to one or more writing systems.

The query log component 106 may maintain information identifying the frequency with which queries are submitted to the search provider 100. Similarly, the query log component 106 may maintain information identifying the frequency with which a given query follows a related query. For example, during a given session a user conducting a search may submit a query comprising the terms "intellectual property," written according to one or more writing systems of a language with multiple writing systems, e.g., Japanese. During the same session, the user may submit a query comprising the terms "patent attorney," written according to one or more Japanese writing systems. The query log component 106 may maintain information identifying the frequency with which the query "patent attorney" follows the query "intellectual property" during a given user's session.

The search engine 107 may utilize the query logs maintained by the query log component 106 to identify a candidate set comprising one or more queries that are statistically significantly related to a query received from a given client device 124a, 124b, and 124c. The one or more queries identified as related to a given query, as indicated by the query logs maintained in the query log component 106, may be used to supplement or generate a candidate set of related queries. The candidate set of related queries may comprise queries written according to one or more writing systems of a given language with multiple writing systems, such as Japanese. Exemplary methods for identifying one or more queries related to a given query using query logs are described in commonly owned U.S. patent application Ser. No. 11/200,851, entitled "SYSTEM AND METHOD FOR DETERMINING ALTERNATE SEARCH QUERIES," and U.S. Provisional Application No. 60/736,133, entitled "MODULAR OPTIMIZED DYNAMIC SETS," the disclosures of which are hereby incorporated by reference in their entirety.

A similarity component 104 uses the candidate set identified by the search engine 107 to calculate a similarity score for the one or more queries in the candidate set of related queries. The similarity component 104 is operative to select a given query Q' from the candidate set of related queries and calculate a similarity score for Q', indicating the strength of the similarity in meaning of Q' with respect to a given query Q received from a given client device 124a, 124b and 124c. The similarity component 104 is operative to calculate a similarity score for each of the one or more queries in the candidate set of related queries identified by the search engine 107 according to methods described herein.

The similarity component 104 may utilize a conversion component 110 to calculate a similarity score for each query Q' in the candidate set of related queries identified by the search engine 107. According to one embodiment of the invention, the conversion component 110 converts a given query into one or more or written formats. The one or more written formats of a given query Q' generated by the conversion component 110 may be delivered to the similarity component 104 to facilitate the calculation of a similarity score. For example, the similarity component 104 may perform numerous comparisons with respect to a given query Q, received from a user, and a related query Q', selected from a candidate set of related queries, in order to calculate an accurate similarity score. As previously described, however, the one or more queries in the candidate set of related queries may be written according to one or more writing systems of a given language with multiple writing systems. Similarly, a query received from a given client device 124a, 124b, and 124c may be written according to one or more systems of a given language with multiple writing systems. The one or more comparisons performed by the similarity component 104 may require a query received from a user, Q, and a given query selected from the candidate set of related queries, Q', to be expressed in accordance with a particular writing system. For example, the similarity component 104 may require that the one or more JASCII characters of a given query Q and a related query Q' be converted to ASCII characters in order to compare the two queries.

In order to compare a query Q and a query Q', which may be written according to different writing systems, the similarity component 104 may deliver a given query to the conversion component 110. According to one embodiment of the invention, the conversion component 110 is operative to identify the language and writing system associated with a given query and convert the query into one or more alternate written formats. The candidate set identified by the search engine 107 may comprise queries written according to a variety of writing systems of a given language with multiple writing systems, such as the Japanese Kanji, Kana, JASCII, and Romaji writing systems. The conversion component 110 is operative to identify a query as written according to one or more Japanese writing systems and convert the query into one or more alternate writing systems. For example, the conversion component 110 is operative to identify a query as written according to the Japanese Katakana writing system and convert the query in accordance with the Japanese Romaji writing system. Similarly, the conversion component 110 is operative to identify a query as comprising one or more JASCII characters and convert the one or more JASCII characters to ASCII characters in order facilitate the calculation of a similarity score by the similarity component 104.

According to one embodiment of the invention, the similarity scores calculated by the similarity component 104 for the one or more queries in the candidate set of related queries are used by a distribution component 116 to select one or more queries from the candidate set for distribution. The selection of queries based upon similarity scores allows for the selection of queries that are the most similar in meaning with respect to a given query Q. For example, the distribution component 116 may select one or more queries from the candidate set of related queries with similarity scores exceeding a given threshold. Similarly, the distribution component may select the N queries from the candidate set with the greatest similarity scores. Those of skill in the art recognize other techniques for selecting one or more queries from a candidate set using a similarity score.

The distribution component 116 may distribute the one or more queries selected from the candidate set. According to one embodiment of the invention, the distribution component 116 displays the queries selected from the candidate set to a user via the network 122 as "suggested alternate queries" or "queries similar in meaning." Alternatively, or in conjunction with the foregoing, the distribution component 116 is operative to deliver the one or more queries selected to the search engine 107, which may embed the selected queries in a search result web page that may be viewed by a given user of a client device 124a, 124b, and 124c communicatively coupled to the network 122.

The similarity scores calculated by the similarity component 104 for the one or more queries in the candidate set may further be used to select one or more items of content, including advertisements, for distribution in response to a given request. According to one embodiment of the invention, advertisements may be maintained in the abovementioned data stores 102 and 108, or in one or more disparate data stores (not illustrated). The one or more local 102, remote 108, or disparate data stores are operative to maintain one or more advertisements and associated bids for terms corresponding to the advertisements. For example, a given advertiser may wish to display a given advertisement for notebook computers. The advertiser may thus bid on the terms "notebook computer" and identify the advertisement that is to be displayed in response to a query comprising the terms "notebook computer." When the search provider 100 receives a query, the search engine 107 may search local and remote data stores 102 and 108, or one or more disparate data stores, to determine whether one or more advertisers have provided bids for the one or more terms comprising the query received. If one or more bids for the terms comprising the query are identified, the advertisements associated with the bids for the one or more terms may be retrieved and displayed to the user on the user's client device 124a, 124b and 124c using the distribution component 116. If the user selects a given advertisement displayed, the advertiser associated with the advertisement selected may be charged a monetary sum in accordance with the advertiser's bid.

An advertiser, however, may choose to bid upon terms written according to only a single writing system of a language with multiple writing systems. For example, an advertiser may choose to bid upon terms written according to only the Japanese Hiragana writing system. As previously described, however, the one or more search queries submitted by users of client devices 124a, 124b, and 124c may comprise terms and phrases written according to one or more writing systems. The search engine 107 may thus utilize the queries with similarity scores exceeding a given threshold to expand the breadth of advertisements retrieved in response to a given query. According to one embodiment of the invention, the search engine 107 identifies the one or more advertisements responsive to the terms comprising the one or more queries with similarity scores exceeding a given threshold. The one or more advertisements identified as responsive to the terms comprising the queries with similarity scores exceeding a given threshold may be selected for distribution to one or more client devices 124a, 124b, and 124c.

For example, a user of a client device 124a, 124b and 124c may formulate a search query Q comprised of Japanese terms written according to both the Japanese Kanji and Romaji writing systems. The user may submit the query to the search provider 100 via the network 122. The search engine 107 may determine that no advertisers have provided bids for the Kanji and Romaji terms utilized by the user. Alternatively, or in conjunction with the foregoing, the search engine 107 may determine that displaying the advertisements corresponding to the bids associated with the Kanji and Romaji terms utilized by the user will result in little if any revenue. The search engine 107, however, may utilize the terms comprising the one or more queries selected from the candidate set with similarity scores exceeding a given threshold to identify one or more terms with associated bids. Similarly, the search engine 107 may utilize the terms comprising the one or more queries selected from the candidate set with similarity scores exceeding a given threshold to identify one or more terms with bids exceeding a given threshold. The search engine 107 may thereafter utilize the one or more terms with associated bids, or the one or more terms with associated bids exceeding a given threshold, to select one or more advertisements responsive to the search query Q formulated by the user.

According to another example, assume a given query Q' selected from the candidate set with a similarity score exceeding a given threshold comprises Hiragana terms, whereas the abovementioned query Q formulated by the user comprises Kanji and Romaji terms. The search engine may utilize the one or more Hiragana terms comprising query Q' to determine whether one or more advertisers have bid upon the Hiragana terms comprising query Q'. Similarly, the search engine may determine whether one or more advertisers have provided bids for the one or more Hiragana terms comprising query Q' exceeding a given threshold. The search engine 107 may retrieve the one or more advertisements with associated bids for the terms comprising query Q' and deliver the one or more advertisements to the distribution component. According to one embodiment of the invention, the search engine 107 retrieves the one or more advertisements with the greatest associated bids for the one or more terms comprising query Q'. The distribution component 116 may thereafter distribute the one or more advertisements to the user that submitted the query Q.

While the above embodiment describes the receipt and processing of queries, the search provider 100 system illustrated in FIG. 1 is not limited to receiving and calculating similarity scores for queries, and may further be used to calculate similarity scores for one or more terms comprising one or more strings of text. Users of client devices 124a, 124b, and 124c may deliver to the search provider 100 one or more strings of text comprising one or more terms, including but not limited to, phrases, sentences, paragraphs, and documents written according to one or more writing systems of a language with multiple writing systems. Accordingly, the search provider 100 records a log of these one or more strings of text in one or more log files. The search provider 100 is operative to identify a candidate set comprising one or more items from its log files, wherein a given item comprises one or more sets of terms related to the one or more terms delivered by a given user of a client device 124a, 124b, and 124c. For example, a given item in the candidate set may comprise a phrase or a sentence. Similarly, a given item in the candidate set may comprise a paragraph or an entire document. The search provider may calculate a similarity score for the one or more items in the candidate set indicating the strength of the similarity in meaning of an item with respect to the one or more terms received from a client device 124a, 124b, and 124c.

Figure 2:
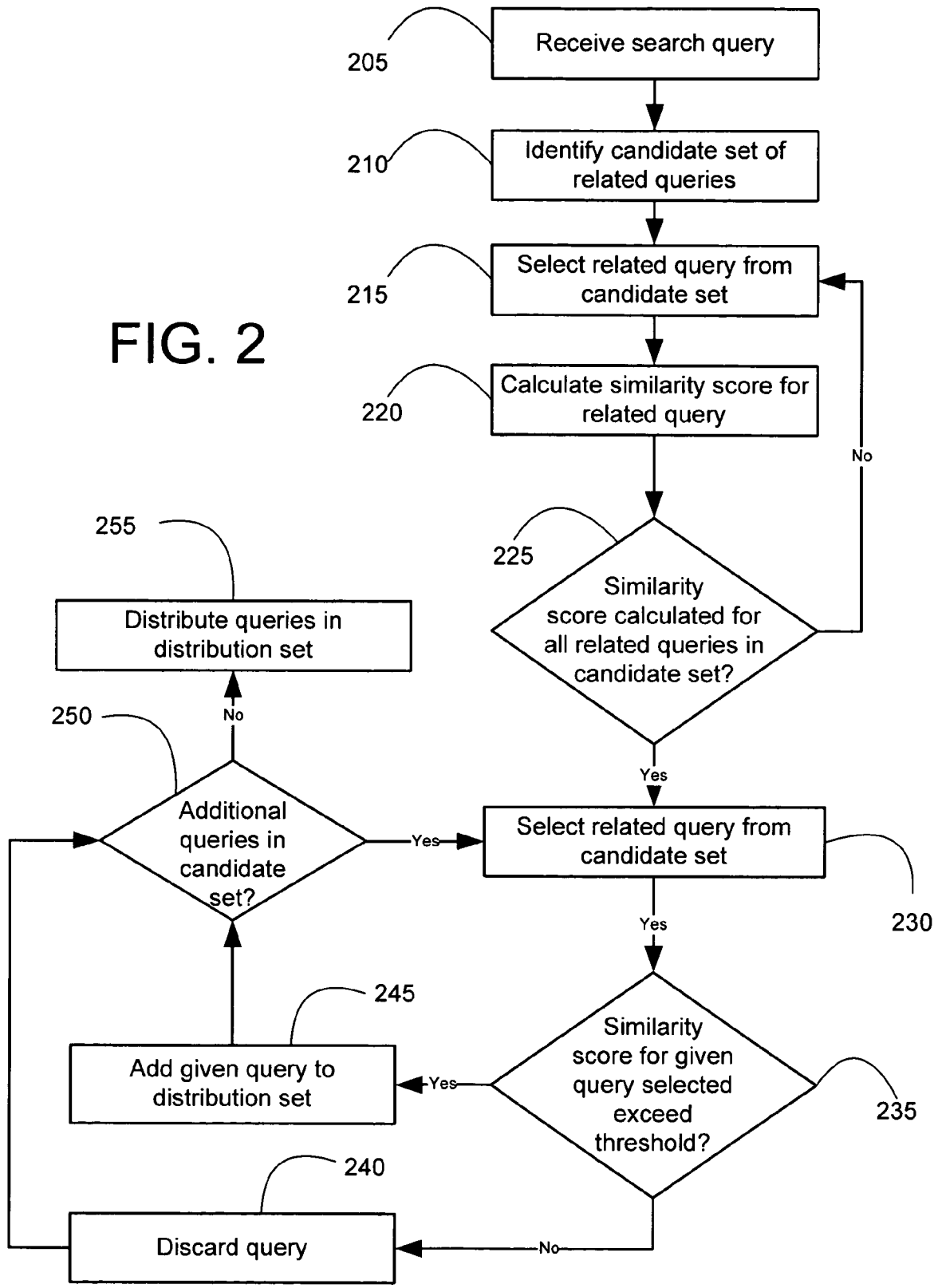
FIG. 2 is a flow diagram illustrating one embodiment of a method for selecting one or more related queries written in accordance with a combination of one or more writing systems of a language with multiple writing systems, according to one embodiment of the present invention.

FIG. 2 illustrates one embodiment of a method for selecting one or more queries Q' from a candidate set that are related in meaning to a given query Q, wherein query Q and Q' are written in accordance with one or more writing systems of a language with multiple writing systems. As illustrated in FIG. 2, a search query is received from a given user, step 205. The query may be received from a client device communicatively coupled to a network, such as the Internet, and comprise one or more terms or phrases written according to combinations of one or more writing systems of a language with multiple writing systems. For example, the query received from a user may comprise Japanese terms written in accordance with the Kanji, Katakana, and Hiragana writing systems.

A candidate set comprised of queries related to a given query Q formulated by a user is identified, step 210. The candidate set may be comprised of queries written according to one or more writing systems of the language associated with the user's query. For example, a given query Q may comprise terms written in accordance with the Japanese Katakana writing system, such as the query ラクテン. The candidate set of related queries may thus comprise one or more queries written in accordance with one or more combinations of one or more Japanese writing systems. For example, the candidate set of queries related to the abovementioned Hiragana query ラクテン may comprise the Romaji query rakuten, the Kanji query 楽天, the Hiragana query らくてん, etc.

The candidate set of queries related to a given query Q may be generated using one or more query logs. According to one embodiment of the invention, query logs may identify one or more queries formulated by a user during a given query session. For example, during a given query session, a user may formulate a query comprising terms written according to the Japanese Hiragana and Kanji writing systems. During the same query session, a user may also formulate a query comprising terms written according to the Japanese Katakana and Romaji writing systems. An analysis may be performed to determine whether the two queries co-occur in the one or more query logs with statistical significance. According to one embodiment of the invention, a statistical significance threshold value may be used to select the one or more queries that are the most related to a given query Q as indicated by one or more query logs.

The candidate set may be generated with the one or more queries identified as related to the given query with statistical significance, or with statistical significance exceeding a given threshold value as indicated by one or more query logs. The one or more queries comprising the candidate set of related queries may be selected according to methods for determining statistically significantly related queries using query logs described in the above-identified applications incorporated by reference in their entirety.

A given query Q' is selected from the candidate set of related queries, step 215. According to the embodiment illustrated in FIG. 2, a similarity score is calculated for the query Q' selected, step 220. The similarity score calculated for a given query Q' provides a numerical value indicating the strength of the similarity of the meaning of query Q' with respect to the meaning of a given query Q, written according to one or more writing systems of a language with multiple writings systems. Table A illustrates one embodiment of an equation that may be used to calculate a similarity score for a given query Q'.

The equation presented in Table A may be used to calculate a score indicating the strength of the similarity in meaning of a given query Q' with respect to a given query Q, which may be written according to one or more Japanese writing systems, including, but not limited to Kanji, Kana, JASCII, Kana, Katakana, Romaji, and Hiragana. Those of skill in the art recognize that the equation illustrated in Table A may be modified so as to provide for the calculation of a similarity score for other languages with multiple writing systems.

TABLE A

Similarity score(Q') = 1.47551 + levr (Q, Q') × −1.68821 + levrs(Q, Q') × 2.48700 + wordr (Q, Q') × 0.44366 + digit (Q, Q') × 0.75388 + kanjid(Q, Q') × 0.22496 + opr(Q, Q') × −0.40083 + japanese (Q, Q') × 0.09368 + levk (Q, Q') × −0.32574 + p12 min(Q, Q') × −0.33258

According to the equation presented in Table A, Q represents a given query written according to one or more Japanese writing systems. Q' represents a query selected from a candidate set of queries related to query Q. Levr is a function for calculating the character edit distance between Q and Q' after converting all Japanese characters to Roman characters. Levrs is a function for calculating the character edit distance between Q and Q' after converting all Japanese characters to Roman characters and removing spaces. Wordr is the word edit distance between Q and Q' after converting all Japanese characters to Roman characters. Digit is a function for identifying whether Q contains any digits not appearing in Q' and vice versa. Kanjid is a function for determining whether either Q or Q' contains Kanji characters, and if so, identifying a Kanji disagreement between Q and Q'. Opr is a function for calculating the number of characters Q and Q' have in common starting from the leftmost character of each query and continuing until the first character disagreement, after all after all Japanese characters in each query have been converted to Roman characters. Levk is a function for calculating the character edit distance between Q and Q' after all Kanji characters have been converted to Kana characters and all non-Japanese characters have been removed. P12min is a function for calculating the query substitution probability of query Q' following query Q in a log of user query sessions. Embodiments of the functions utilized by the similarity score function illustrated in Table A are illustrated in FIG. 3 through FIG. 11.

A check is performed to determine whether a similarity score has been calculated for the one or more queries in the candidate set, step 225. If one or more queries in the candidate set do not have an associated similarity score, an additional query Q' is selected from the candidate set, step 215. Alternatively, if a similarity score has been calculated for the one or more queries in the candidate set, a given query Q' is selected from the candidate set, step 230. A check is performed to determine whether the similarity score associated with the query Q' selected from the candidate set exceeds a given similarity score threshold, step 235. According to one embodiment of the invention, the similarity score threshold comprises a numeric value that may be used to perform a comparison with the similarity score associated with a given query Q'. Because a similarity score indicates the strength of the similarity in meaning of a given query Q' with respect to a query Q, the use of a similarity score threshold facilitates the selection of one or more queries from the candidate set that are the most similar in meaning with respect to the query Q.

If the similarity score associated with a given query Q' exceeds the similarity score threshold, the query Q' is added to a distribution set, step 245. According to one embodiment of the invention, the distribution set comprises the one or more queries selected from the candidate set that have similarity scores exceeding the similarity score threshold. If the similarity score associated with a given query Q' does not exceed the similarity score threshold, the query Q' is not added to the distribution set, step 240.

A check is performed to determine whether there are additional queries in the candidate set that require analysis, step 250. If one or more queries in the candidate require analysis, an additional query Q' is selected from the candidate set, step 230. Alternatively, after all queries in the candidate set have been analyzed, and the distribution set has been populated with the one or more queries exceeding the similarity score threshold, the one or more queries in the distribution set are distributed, step 255.

The one or more queries in the distribution set of queries exceeding the similarity score threshold may be delivered to the user who submitted the query Q. According to one embodiment of the invention, the one or more queries in the distribution set are displayed to the user in a results web page. For example, a user may be presented with a web page comprising results, such as links to content items that are responsive to the query Q, as well the one or more Q' queries comprising the distribution set that are most similar in meaning with respect to the query Q. The one or more queries in the distribution set delivered to a given user may be displayed in a ranked list according to similarity score to indicate to the user the relative strength of the similarity in meaning of a given query Q' with respect to the query Q.

FIGS. 3 through 11 illustrate embodiments of the functions presented in Table A that may be used to calculate a similarity score for a given query Q' selected from a candidate set of queries. As previously described, the plurality of functions illustrated in Table A, and further described in FIGS. 3 through 11, may be used to calculate a similarity score indicating the strength of the similarity in meaning of a given query Q' with respect to a query Q, written according to one or more Japanese writing systems. Those of skill in the art recognize, however, that the embodiments of the functions illustrated in FIGS. 3 through 11 are exemplary and not intended to be limited to the Japanese language and writing systems, and may be modified so as to provide for the calculation of a similarity score for other languages with multiple writing systems. Those of skill in the art further recognize that the functions illustrated in FIGS. 3 through 11 are not limited to calculating similarity scores for a candidate set comprising one or more queries related to a given query and may be used to calculate similarity scores for a candidate set of queries comprising one or more queries selected according to a plurality of techniques. Additionally, those of skill in the art recognize that the functions illustrated in FIGS. 3 through 11 are not limited to calculating similarity scores for a candidate set comprising one or more queries and may be modified so as to calculate similarity scores for one or more sets of terms, including but not limited to, phrases, sentences, paragraphs, and documents.

Figure 3:
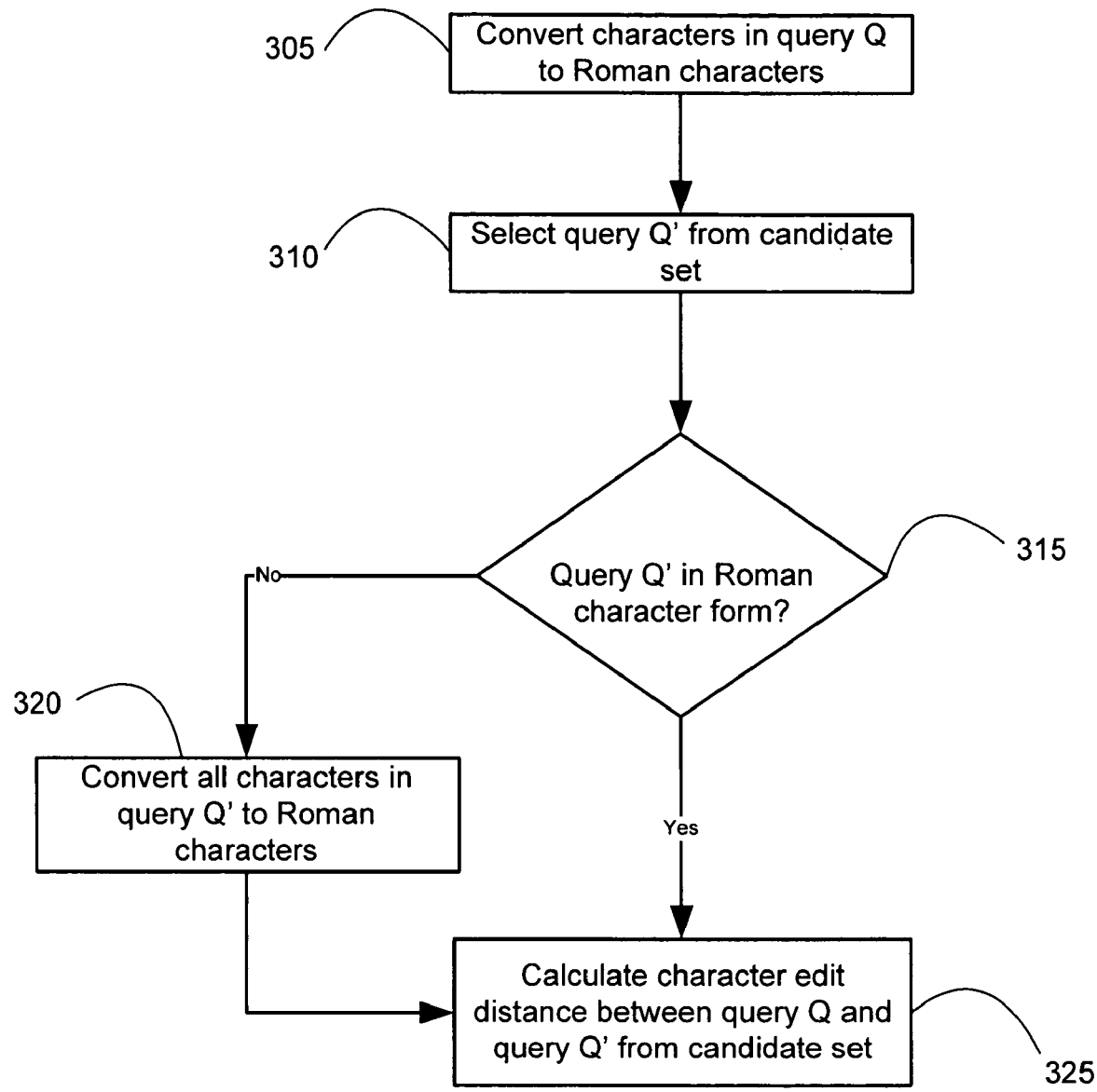
FIG. 3 is a flow diagram illustrating one embodiment of a method for calculating the character edit distance between two queries written in accordance with one or more writing systems of a language with multiple writing systems, according to one embodiment of the present invention.

FIG. 3 illustrates one embodiment of a method for calculating the character edit distance between a given query Q, written according to one or more Japanese writing systems, and a query Q' selected from a candidate set of queries. The method presented in FIG. 3 illustrates one embodiment of the levk function utilized by the similarity score function illustrated in Table A.

The one or more characters comprising a query Q, which may be written according to one or more Japanese writing systems, such as Kanji, Katakana, Hiragana, etc., are converted to Roman characters, step 305. A given query Q' is selected from a candidate set comprised of one or more queries, step 310. The query Q' selected from the candidate set may be written according to one or more writing systems of the language associated with query Q. For example, Q' may be written according to the same writing system as the query Q or one or more alternate Japanese writing systems, such as the Japanese Romaji writing system, the Japanese Kana writing system, etc. A check is performed to determine whether the characters comprising Q' are in Roman character form, step 315. If query Q' is not in Roman character form, the one or more characters comprising Q' are converted into Roman characters, step 320. If the one or more terms comprising Q' are already in Roman character form, or after all the characters in Q' have been converted to Roman character form, a calculation is performed to identify the character edit distance between query Q and query Q', step 325. The character edit distance value may be provided to the similarity score function illustrated in Table A in order to calculate a similarity score for Q'.

Figure 4:
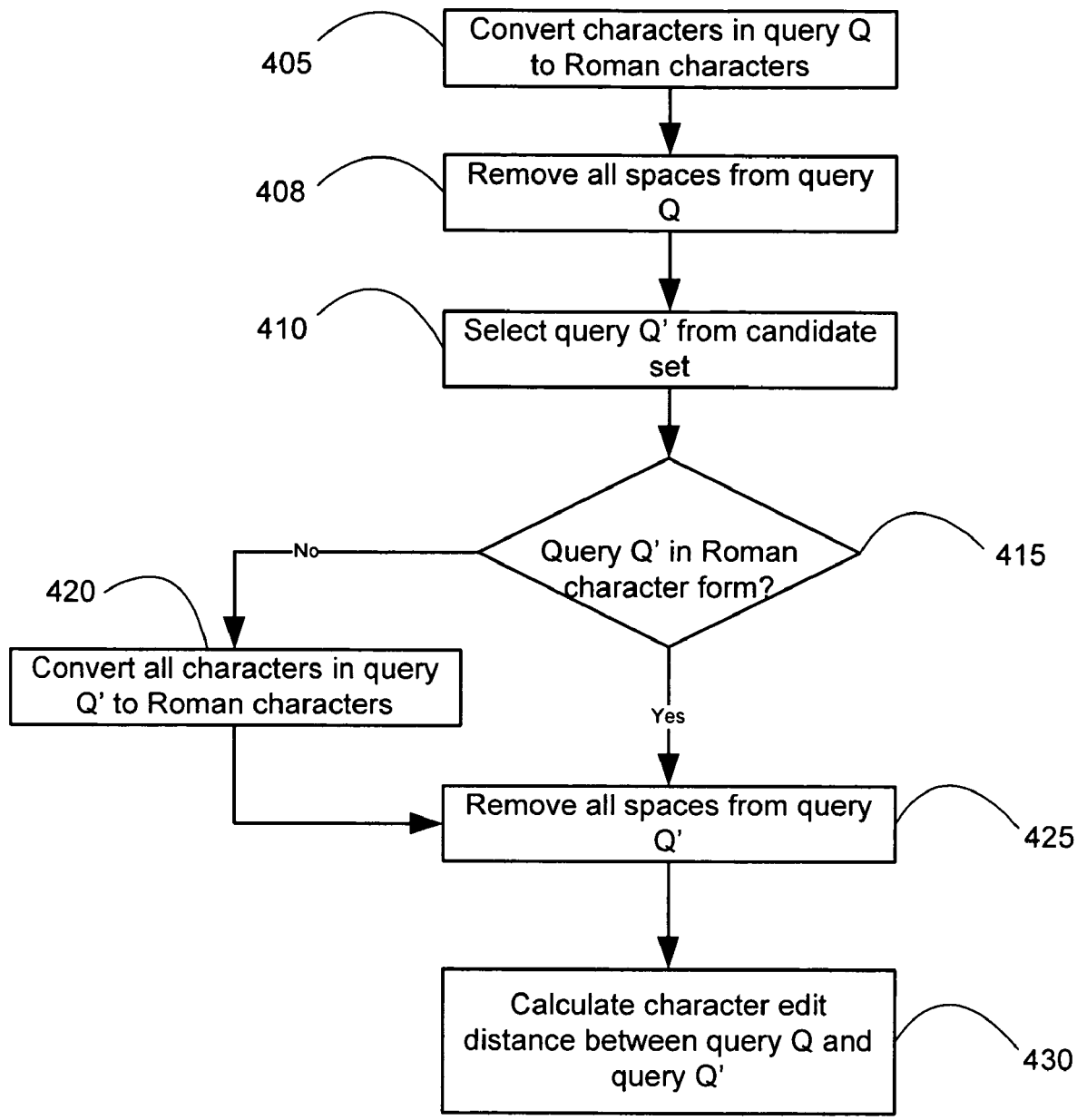
FIG. 4 is a flow diagram illustrating another embodiment for calculating the character edit distance between two queries written in accordance with one or more writing systems of a language with multiple writing systems, according to one embodiment of the present invention.

FIG. 4 illustrates one embodiment of a method for calculating the character edit distance between a given query Q, written according to one or more Japanese writing systems, and a query Q' selected from a candidate set of queries. The embodiment illustrated in FIG. 4 provides one embodiment of the levrs function used by the similarity score frictions illustrated in Table A.

According to the embodiment illustrated in FIG. 4, query Q, written according to one or more Japanese writing systems, such as Kanji, Katakana, or Hiragana, is converted to Roman character form, step 405. Thereafter, all space characters appearing in the Roman character form query Q are removed, step 408. For example, a given query Q may comprise the Kanji terms 電車男 After conversion to Roman character form, query Q may comprise the terms "densha otoko," and after removing spaces query Q may comprise the characters "denshaotoko."

A given query Q' is selected from a candidate set comprising one or more queries, step 410. A check is performed to determine whether Q' is in Roman character form, step 415. If query Q' is not Roman character form, the one or more characters comprising query Q' are converted to Roman characters, step 420. If the characters comprising query Q' are already in Roman character form, or after the characters comprising query Q' have been converted to Roman character form, all spaces within query Q' are removed, step 425. The character edit distance between the Roman character form of query Q and Q' is thereafter calculated, step 430. The calculated character edit distance between query Q and Q' may be used by the similarity score function illustrated in Table A to calculate a similarity score for Q'.

Figure 5:
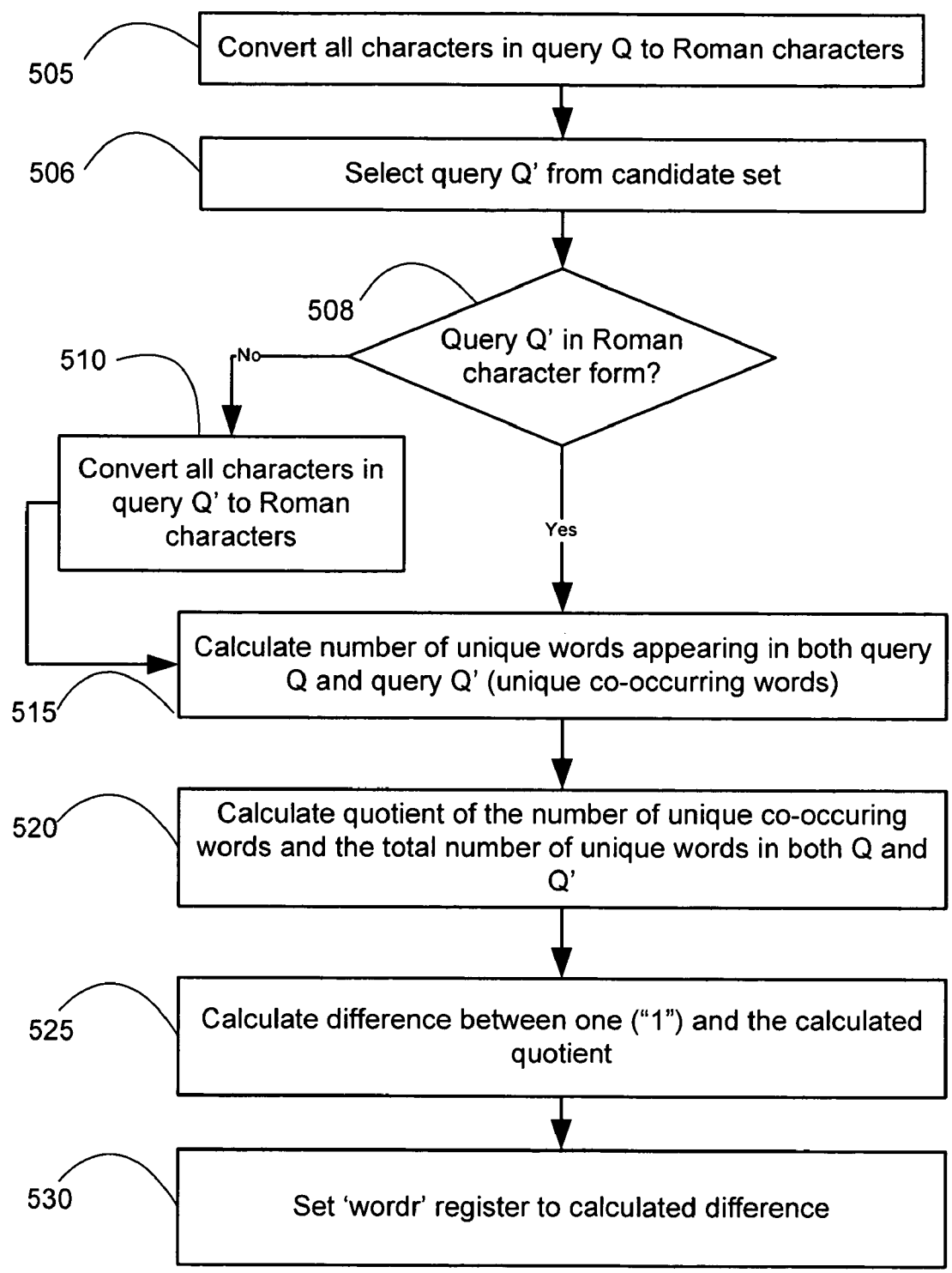
FIG. 5 is a flow diagram illustrating one embodiment of a method for calculating the word edit distance between two queries written in accordance with one or more writing systems of a language with multiple writing systems, according to one embodiment of the present invention.

FIG. 5 illustrates one embodiment of the wordr function illustrated in Table A. The embodiment of the wordr function illustrated in FIG. 5 provides for the calculation of the word edit distance between a given query Q, written according to one or more Japanese writing systems, and a query Q', selected from a candidate set of queries. According to one embodiment of the invention, the word edit distance between a given query Q and a query Q' is the difference between the value one ("1") and the quotient of the number of unique space-separated co-occurring words in Q and Q' and the total number of unique space-separated words in both Q and Q'.

The characters comprising a given query Q, written according to one or more Japanese writing systems, are converted to Roman character form, step 505. Thereafter, a given query Q' is selected from a candidate set of queries, step 506. A check is performed to determine whether the query Q' is in Roman character form, step 508. If query Q' is not in Roman character form, the characters comprising query Q' are converted to Roman characters, step 510. If the characters comprising the query Q' are already in Roman character form, or after the characters comprising Q' have been converted to Roman character form, the number of unique space-separated co-occurring words in Q and Q' are identified, step 515. The quotient of the number of unique space-separated co-occurring words in Q and Q' and the total number of unique space-separated words in both Q and Q' is calculated, step 520. According to one embodiment of the invention, the number of unique space-separated co-occurring words comprises the number of unique words that appear in both a given query Q and a query Q'. Additionally, the total number of unique space-separated words in both Q and Q' comprises the sum of the unique space-separated words in a given query Q and a query The difference between the value one ("1") and the calculated quotient is calculated, step 525, and assigned to a 'wordr' register, step 530. According to one embodiment of the invention, the 'wordr' register comprises a memory device for storing a given numeric value. The value assigned to the 'wordr' register may be used by the similarity score function illustrated in Table A to calculate a similarity score for the query For example, a given query Q, in Roman character form, may be comprised of the terms "kuruma kemuri." Similarly, a given query Q' in Roman character form may be comprised of the terms "sora kemuri." The number of unique space-separated co-occurring words in Q and Q' is one ("1"), namely, the word "kemuri," wherein the total number of unique space-separated words in both Q and Q' is three ("3"), namely the words "kuruma," "sora," and "kemuri." Thus, the quotient of the number of unique space-separated co-occurring words in Q and Q' and the total number of unique space-separated words in both Q and Q' is ⅓. Additionally, the difference between one ("1") and the calculated quotient is ⅔. The value ⅔ may be assigned to the 'wordr' register and used by the similarity score function illustrated in Table A to calculate a similarity score for query Q'.

Figure 6:
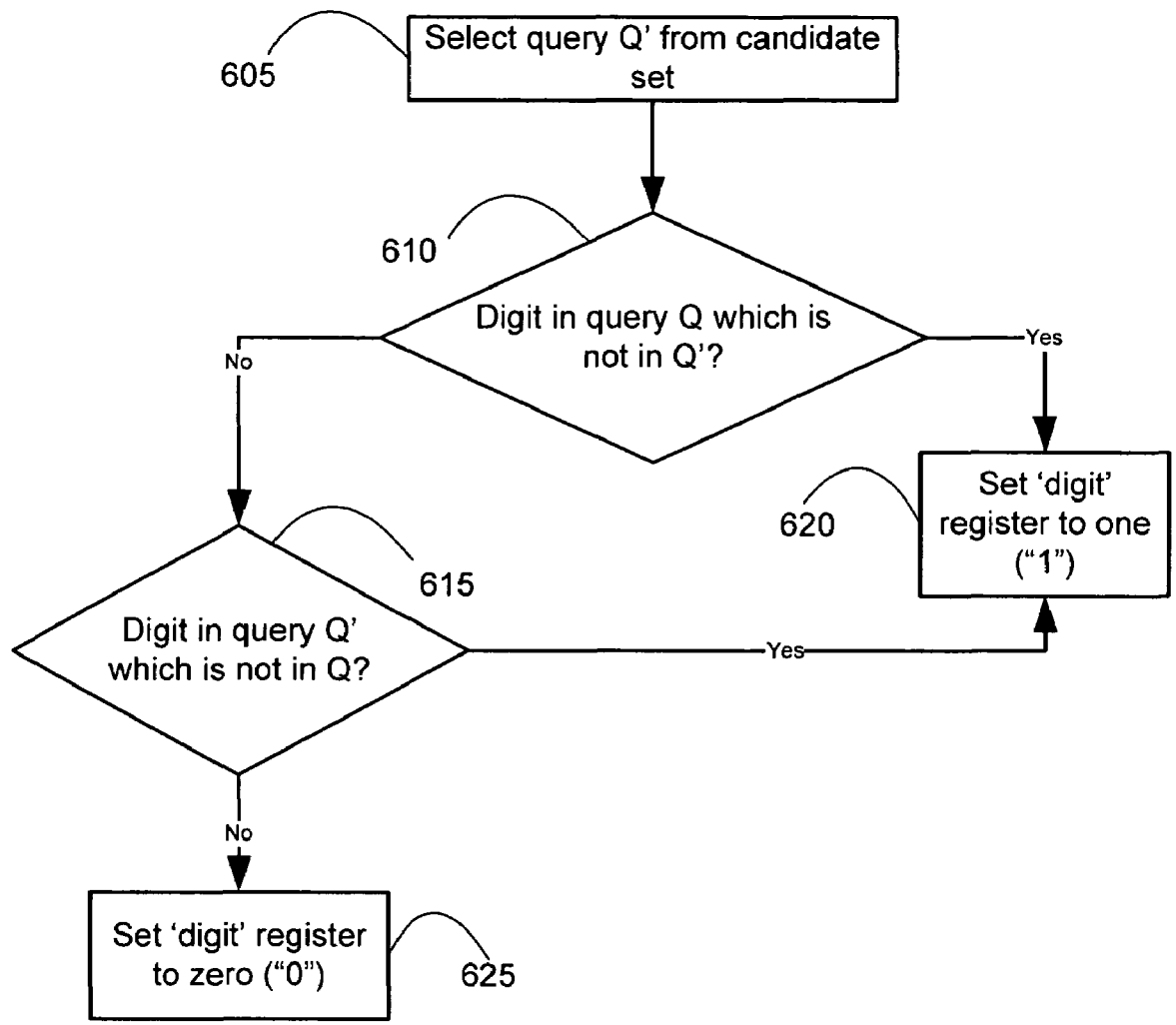
FIG. 6 is a flow diagram illustrating one embodiment of a method for identifying differences in the digits appearing in two queries written in accordance with one or more writing systems of a language with multiple writing systems, according to one embodiment of the present invention.

FIG. 6 illustrates one embodiment of a method for determining whether a digit is unique to a given query Q, written according to one or more Japanese writing systems, in comparison with a query Q' selected from a candidate set of queries. The embodiment presented in FIG. 6 provides one embodiment of the digit function used by the similarity score function illustrated in Table A.

A given query Q' is selected from a candidate set comprised of queries written according to one or more writing systems, step 605. A check is performed to determine whether a digit in a given query Q does not appear in query Q'. For example, a given query Q may contain the Japanese Kanji digits 六十八(corresponding to the value expressed by Arabic numerals "68"), and a given query Q' may contain the Japanese Kanji digits 六十八(corresponding to the value expressed by Arabic numerals "98"). The check performed at step 610 would therefore determine that the Japanese Kanji digit 六is unique to query Q, as it does not appear in query Q'. Similarly, a given query Q may comprise the Japanese Kanji characters and the Arabic numerals 楽天2005, and a given query Q' may comprise the Japanese Kanji characters and the Arabic numerals 楽天2004. The check performed at step 610 would determine that the Arabic numeral 5 is unique to query Q, as it does not appear in query Q'.

If a digit is identified as appearing in query Q and not in query Q', a 'digit' register is set to the value one ("1"), indicating that query Q contains a digit not in query Q', step 620. According to one embodiment of the invention, the 'digit'register comprises a memory device for storing a given numeric value.

Alternatively, if Q' contains each of the one or more digits appearing in query Q, an additional check is performed to determine whether a digit in query Q' does not appear in query Q, step 615. If query Q' contains a digit which does not appear in query Q, the abovementioned 'digit' register is set to the value one ("1"), indicating that query Q' contains a digit unique to Q', step 620. Alternatively, if query Q contains each of the one or more digits in Q', the 'digit' register is set to zero ("0"), step 625, indicating that the one or more digits in query Q' appear in query Q, and vice versa. The value assigned to the 'digit' register, either zero ("0") or one ("1"), may be used by the similarity score function illustrated in Table A to calculate a similarity score for the query Q'.

Figure 7:
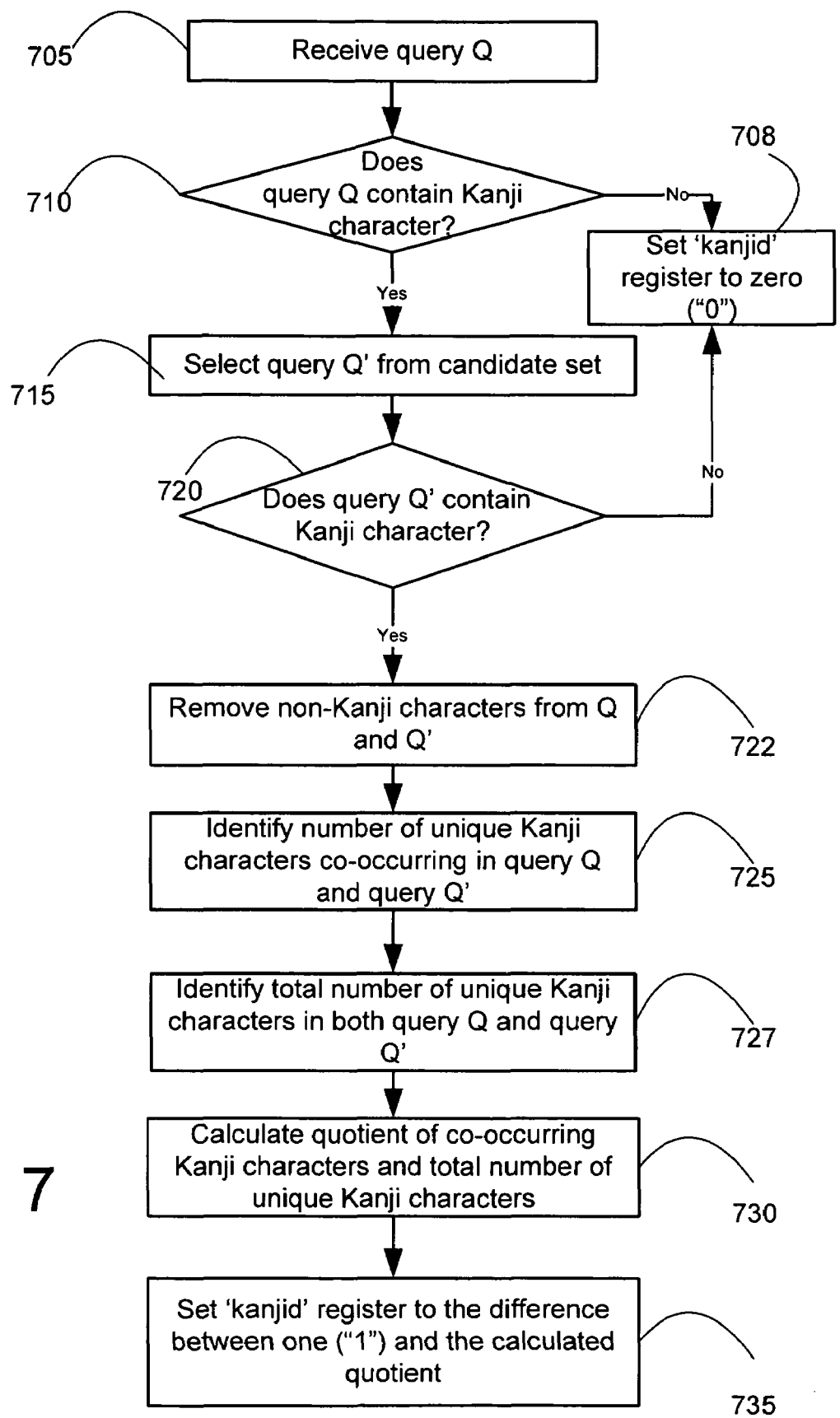
FIG. 7 is a flow diagram illustrating one embodiment of a method for calculating the character edit distance between two queries written in accordance with one or more writing systems of a language with multiple writing systems considering the characters of only one of the writings systems, according to one embodiment of the present invention.

FIG. 7 presents one embodiment of the kanjid function used by the similarity score function illustrated in Table A. A given query Q, which may be written according to one or more Japanese writing systems, is received, step 705. A check is performed to determine whether query Q contains one or more Japanese Kanji characters, step 710. If query Q does not contain any Kanji characters, a 'kanjid' register is set to zero ("0"), step 708, wherein the 'kanjid' register may comprise a memory device for storing a given numeric value. Alternatively, if query Q contains one or more Kanji characters, a query Q' is selected from a candidate set of queries, step 715.

A check is performed to determine whether the query Q' selected from the candidate set contains one or more Kanji characters, step 720. If query Q' does not contain any Kanji characters, the aforementioned 'kanjid' register is set to zero ("0"), step 708. In contrast, if Q' contains one or more Kanji characters, the one or more non-Kanji characters in Q and Q' are removed, step 722. The number of unique Kanji characters co-occurring in query Q and query Q' are thereafter identified, step 725. For example, if after removing non-Kanji characters query Q is comprised of Kanji characters 楽天市場, and if after removing non-Kanji characters query Q' is comprised of Kanji characters 楽天, the number of unique co-occurring Kanji characters in Q and Q' is two ("2"), namely 楽天.

Figure 8:
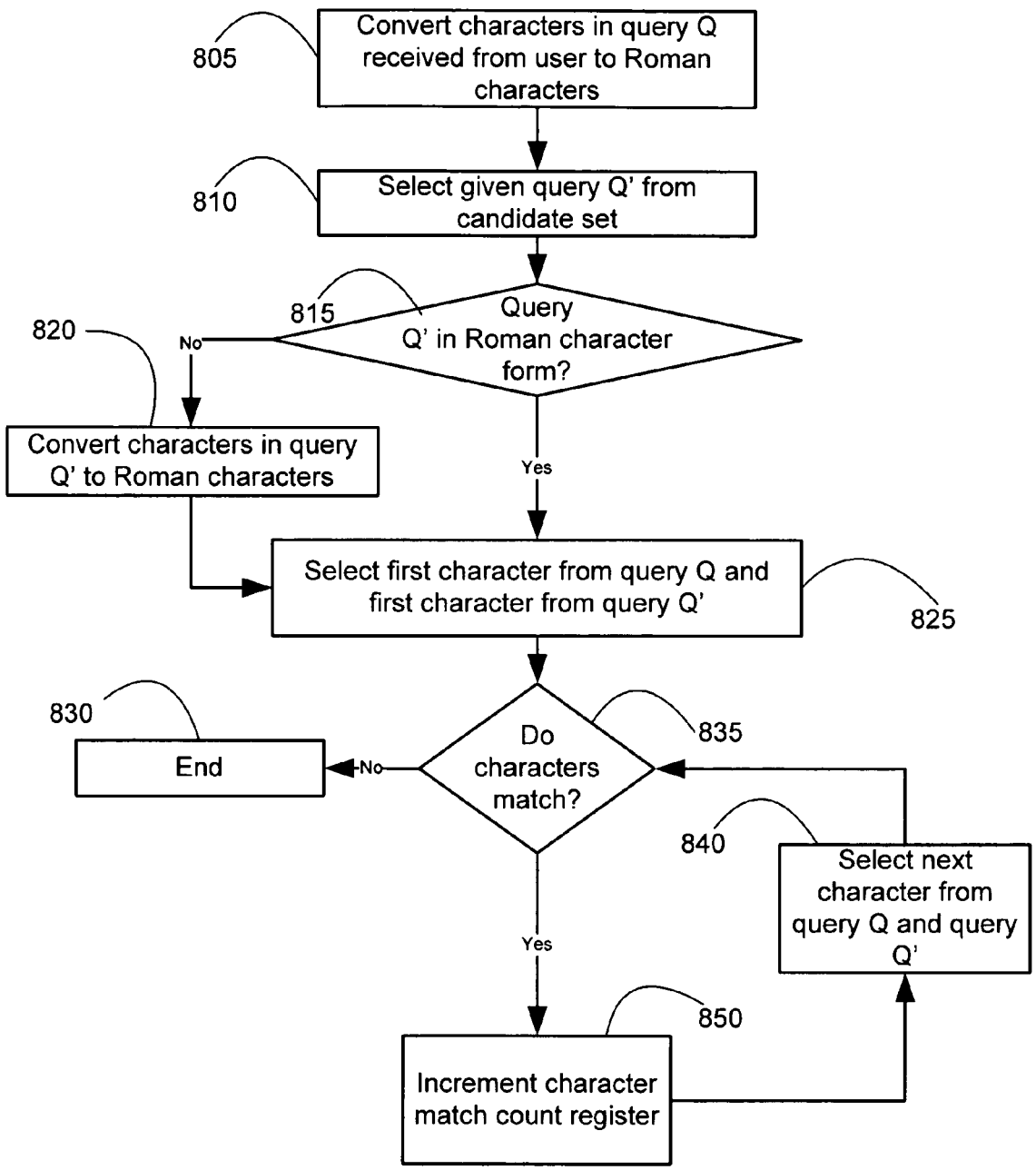
FIG. 8 is a flow diagram illustrating one embodiment of a method for identifying the number of characters overlapping in the prefixes of two queries written in accordance with one or more writing systems of a language with multiple writing systems, according to one embodiment of the present invention.

The total number of unique Kanji characters in both Q and Q' is thereafter identified, step 727. For example, the total number of unique Kanji characters in both Q and Q', wherein Q is comprised of Kanji characters 楽天市場,and Q' is comprised of Kanji characters 楽天, is six ("6"), namely the unique Kanji characters 楽天市場from query Q, and the unique Kanji characters 楽天from query Q'. The quotient of the number of co-occurring Kanji characters and the total unique Kanji characters is calculated, step 730. The 'kanjid' register is set to the value of the difference between one ("1") and the calculated quotient, step 735. The 'kanjid' register value may be used by the similarity score function illustrated in Table A to calculate a similarity score for FIG. 8 illustrates one embodiment of a method for identifying the number of characters overlapping in the prefixes of a given query Q, written according to one or more Japanese writings systems, and a query Q' selected from a candidate set of queries, starting with a comparison of the leftmost characters of each query and continuing until the first character disagreement. The method presented in FIG. 8 illustrates one embodiment of the opr function utilized by the similarity score function illustrated in Table A.

A given query Q, written according to one or more Japanese writing systems, is converted to Roman character form, step 805. A query Q' is selected from a candidate set of queries, step 810. A check is performed to determine whether the one or more characters comprising query Q' are in Roman character form, step 815. If the one or more characters comprising query Q' are not in Roman character form, the characters are converted to Roman characters, step 820. If the characters comprising Q' are already in Roman character form, or after the one or more characters comprising Q' have been converted to Roman character form, the first Roman characters of query Q and query Q' are selected, step 825.

A check is performed to determine whether the first character selected from query Q and the first character selected from query Q' match, step 835. If the first characters selected from Q and Q' do not match, processing terminates, step 830. Alternatively, if the characters selected match, a character match count register is incremented, step 850, indicating that a character match for query Q and query Q' was identified. According to one embodiment of the invention, the character match count register is initialized with the value zero ("0") and incremented as characters from query Q and query Q' are identified as matching.

Figure 9:
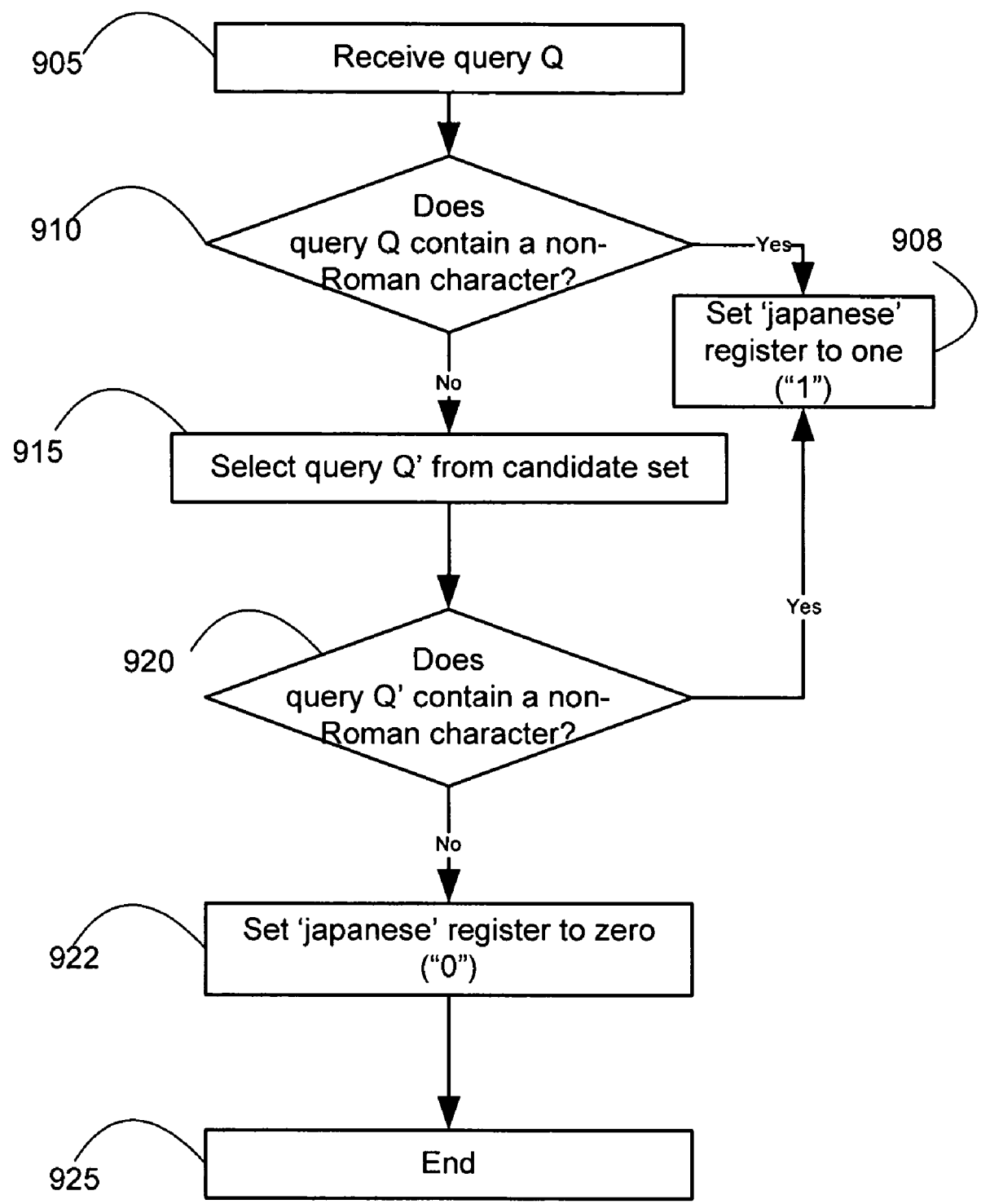
FIG. 9 is a flow diagram illustrating one embodiment of a method for identifying whether two queries written in accordance with one or more writing systems of a language with multiple writing systems have non-Roman characters, according to one embodiment of the present invention.

The next character from Q and Q' are selected, step 840, and a check is performed to determine whether the next characters match, step 835. If the characters selected from Q and Q' do not match, the character match count register is not incremented and processing ends, step 830. When processing terminates, step 830, the value in the character match count register will indicate the number of characters that match in Q and Q'. The value in the character match count register is utilized by the similarity score function illustrated in Table A to calculate a similarity score for query FIG. 9 illustrates one embodiment of a method for identifying whether a given query Q, written according to one or more Japanese writing systems, or a query Q', selected from a candidate set of queries, contain non-Roman characters. The embodiment presented in FIG. 9 illustrates the japanese function used by the similarity score function illustrated in Table A.

A given query Q, written according to one or more Japanese writing systems, is received, step 905. A check is performed to determine whether query Q contains one or more non-Roman characters, step 910. If query Q contains one or more non-Roman characters, a 'japanese' register is set to the value one ("1"), step 908. According to one embodiment of the invention, the 'japanese' register comprises a memory device for storing a given numeric value.

If query Q does not contain one or more non-Roman characters, a query Q' is selected from a candidate set comprising one or more queries, step 915. A check is performed to determine whether query Q' contains one or more non-Roman characters, step 920. If query Q' contains one or more non-Roman characters, the 'japanese' register is set to the value ("1"), step 908. Alternatively, if query Q' contains only non-Roman characters, the 'japanese' register is set to the value zero ("0"), step 922, and processing is thereafter terminated, step 925. The value maintained in the 'japanese' register may be utilized by the similarity score function illustrated in Table A to calculate a similarity score for query Q'.

Figure 10:
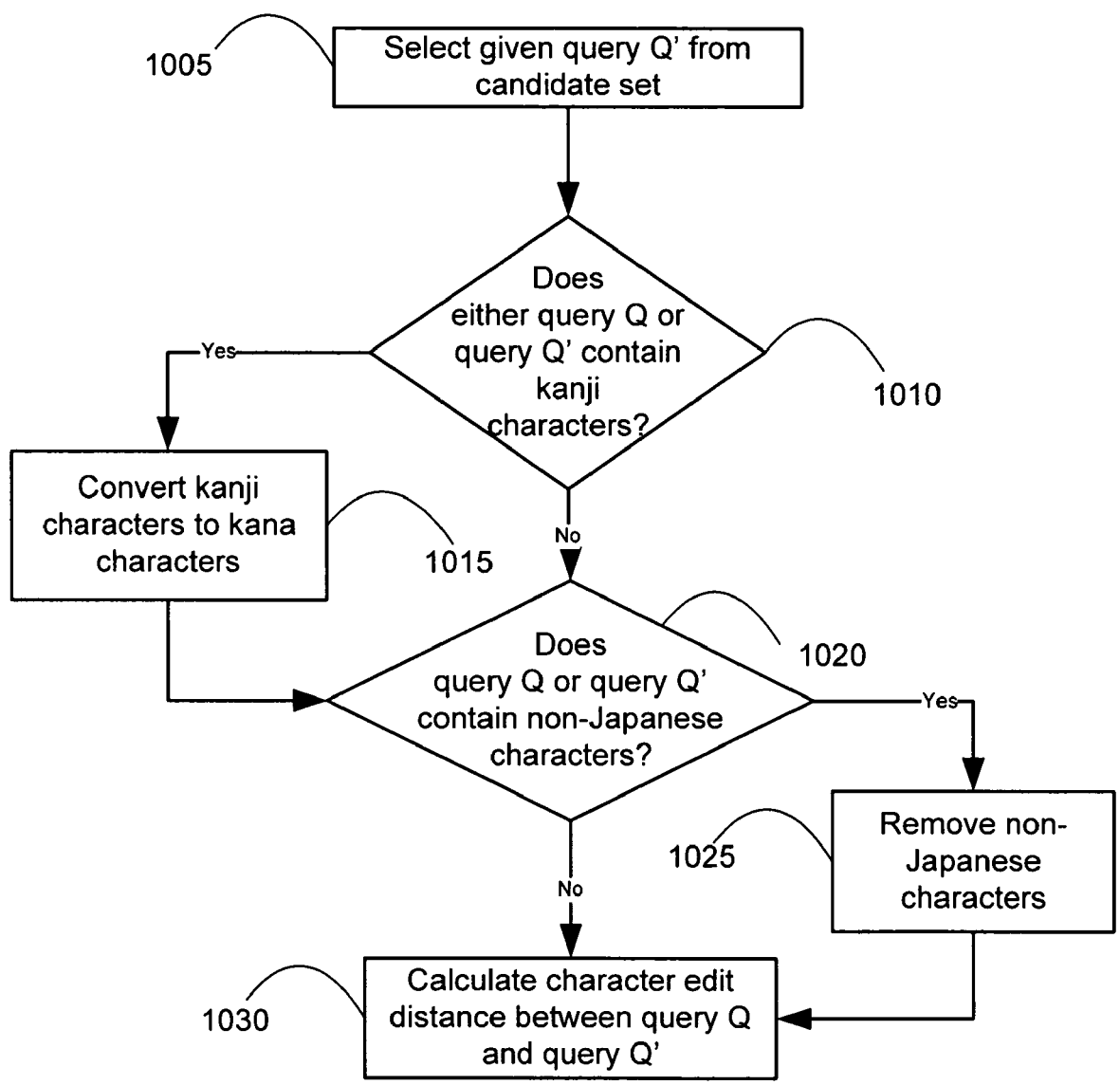
FIG. 10 is a flow diagram illustrating one embodiment of a method for calculating the character edit distance between two queries written in accordance with one or more writing systems of a language with multiple writing systems after both queries have been converted to a given writing system, according to one embodiment of the present invention.

FIG. 10 illustrates one embodiment of a method for determining the character edit distance between a given query Q and a query Q' after all Kanji and non-Japanese characters have been removed from each respective query. The method presented in FIG. 10 illustrates one embodiment of the levk function utilized by the similarity score function illustrated in Table A.

As illustrated in FIG. 10, a given query Q' is selected from a candidate set of queries, step 1005. A check is performed to determine whether query Q' or a given query Q, written according to one or more Japanese writing systems, contains one or more Kanji characters, step 1010. If either query Q or query Q' contain one or more Kanji characters, the Kanji characters in each respective query are converted to Kana characters, step 1015. For example, query Q may be comprised of both Kanji characters and Arabic numerals, such as 人200 After converting the Kanji character to Kana characters, query Q may comprise the characters ひと200.

If neither query Q or query Q' contain Kanji characters, or after all Kanji characters in each respective query have been converted to Kana characters, an additional check is performed to determine whether either query contains non-Japanese characters, step 1020. According to one embodiment of the invention, non-Japanese characters comprise characters not written according to one or more Japanese writing systems. For example, if query Q includes Kana characters and Arabic numerals, such as ひと200 the Arabic numeral "200" may comprise non-Japanese characters.

If either query Q or query Q' contain non-Japanese characters, the non-Japanese characters are removed, step 1025. With reference to the abovementioned example, after removing non-Japanese characters from query Q, namely the Arabic numeral "200," query Q may comprise the Kana characters ひと. If neither query Q nor query Q' contain non-Japanese characters, or after all non-Japanese characters have been removed, the character edit distance between Q and Q' is calculated, step 1030. The character edit distance between query Q and query Q' may be used by the similarity score function illustrated in Table A to calculate a similarity score for Q'.

Figure 11:
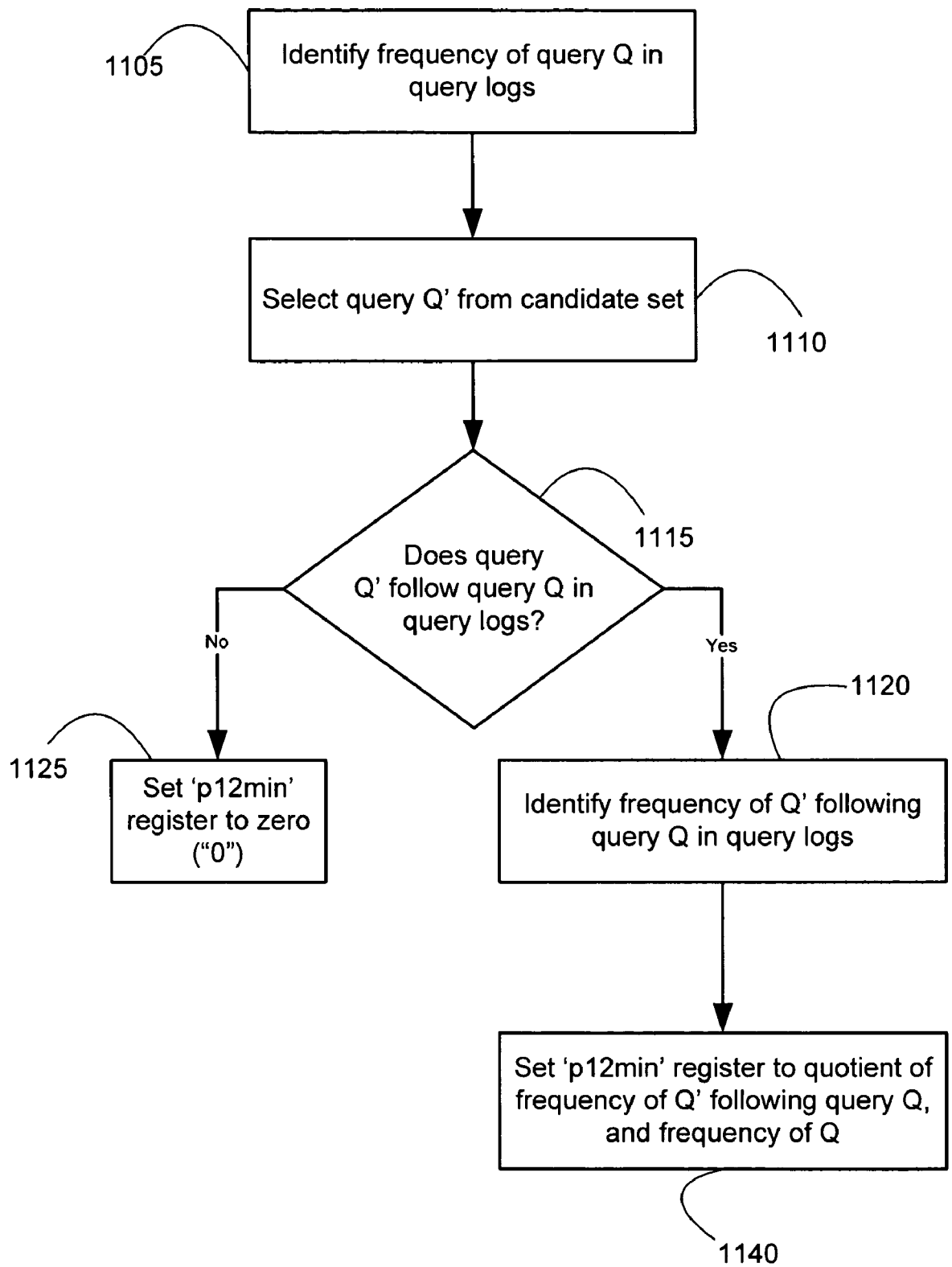
FIG. 11 is a flow diagram illustrating one embodiment of a method for calculating the query and phrase substitution probability of two queries written in accordance with one or more writing systems of a language with multiple writing systems, according to one embodiment of the present invention.

FIG. 11 presents one embodiment of the p12min function utilized by the similarity score function illustrated in Table A. According to one embodiment of the invention, the p12min function calculates the query substitution probability of a given query Q' following a given query Q, and may also be used to calculate the phrase substitution of a phrase P' following a given phrase P. For example, one or more query logs may be maintained identifying the one or more queries and phrases submitted by a given user during a query session. The query logs may identify the order of the one or more queries and phrases submitted by the user, for example, to provide an indication of how the user refined a query Q, how the user rewrote a query Q, how the user utilized one or more alternate writing systems of a language with multiple writings systems to express a query Q, etc. The query logs may further indicate the frequency with which one or more users submitted one or more queries or phrases.

The frequency with which a given query Q appears in one or more query logs is identified, step 1105. A given query Q' is selected from a candidate set of queries, step 1110. A check is performed to determine whether query Q' follows query Q in any of the one or more query logs, step 1115. According to one embodiment of the invention, a check is performed to determine whether query Q' follows query Q in the query logs for a given user's query session, wherein a query session may comprise the one or more queries submitted by a user during a given time period.

If query Q' does not follow query Q in any of the one or more query logs, a 'p12min' register is set to zero ("0"), step 1125, wherein the 'p12min' register may comprise a memory device for storing a given numeric value. Alternatively, if query Q' is identified as following Q in on or more of the query logs, the frequency with which query Q' follows query Q in the query logs is identified, step 1120. The 'p12min' register is set to the value of the quotient of the frequency with which query Q' follows query Q in the query logs, and the frequency of query Q in the query logs, step 1140. For example, if query Q appears in the query logs twelve ("12") times and Q' follows query Q seven ("7") times in the query logs, the 'p12min' register may be set to the value "7/12."

Those of skill in the art recognize that the functions illustrated in FIGS. 3 through 11, and utilized by the similarity score function illustrated in Table A, are not limited to the Japanese language and may be modified for one or more languages with multiple writing systems. Those of skill in the art further recognize that the similarity score function illustrated in Table A may utilize one or more combinations of the functions illustrated in FIGS. 3 through 11 in order to calculate a similarity score for a given query written according to one or more writing systems of a language with multiple writing systems.

While the invention has been described and illustrated in connection with preferred embodiments, many variations and modifications as will be evident to those skilled in the art may be made without departing from the spirit and scope of the invention, and the invention is thus not to be limited to the precise details of methodology or construction set forth above as such variations and modifications are intended to be included within the scope of the invention.

We claim:

1. A method for identifying one or more queries related to a given query, the method comprising:
   receiving a query written according to one or more writing systems of a language with multiple writing systems;
   identifying a candidate set of queries written according to one or more writing systems of the language with multiple writing systems;
   calculating a number of common characters in a given candidate query before disagreement with the query received;
   calculating a number of total common characters between the given candidate query and the query received;
   calculating a quotient of the frequency with which a selected query from the candidate set follows the received query in one or more query logs and the frequency of the received query in the one or more query logs; and
   calculating a similarity score on the basis of the number of characters before disagreements, the number of total common characters and the quotient of the frequency with which a selected query from the candidate set follows the received query in one or more query logs and the frequency of the received query in the one or more query logs, wherein the similarity score indicates the similarity of the one or more queries with respect to the query received.

2. The method of claim 1 wherein receiving the query comprises receiving a query written according to a combination of one or more Japanese writing systems.

3. The method of claim 1 wherein identifying the candidate set of queries comprises identifying a set of one or more queries related to the query received.

4. The method of claim 3 wherein identifying the candidate set of queries related to the query received comprises identifying one or more queries related to the query received as indicated in one or more query logs.

5. The method of claim 1 wherein receiving the query comprises receiving a query written according to the Japanese Hiragana writing system.

6. The method of claim 1 wherein receiving the query comprises receiving a query written according to the Japanese Katakana writing system.

7. The method of claim 1 wherein receiving the query comprises receiving a query written according to the Japanese Kana writing system.

8. The method of claim 1 wherein receiving the query comprises receiving a query written according to the Japanese Romaji writing system.

9. The method of claim 1 wherein receiving the query comprises receiving a query written according to the Japanese JASCII writing system.

10. The method of claim 1 wherein receiving the query comprises receiving a query written according to the Japanese Kanji writing system.

11. The method of claim 1 wherein receiving the query comprises receiving a set of terms comprising a phrase.

12. The method of claim 1 wherein calculating a score for the one or more queries in the candidate set comprises calculating a score indicating the similarity in meaning of a given query from the candidate with respect to the received query.

13. The method of claim 1 wherein calculating a score comprises:
   converting one or more characters of the received query to Roman characters;
   converting one or more characters of a query selected from the candidate set to Roman characters; and
   calculating a character edit distance between the received query and the selected query from the candidate set.

14. The method of claim 1 wherein calculating a score comprises:
   converting one or more characters of the received query to Roman characters;
   converting one or more characters of a selected query from the candidate set to Roman characters;
   removing space characters from the received query and the selected query from the candidate set; and
   calculating a character edit distance between the received query and the selected query from the candidate set.

15. The method of claim 1 wherein calculating a score comprises:
   converting one or more characters of the received query to Roman characters; converting one or more characters of a query selected from the candidate set to Roman characters;
   identifying a number of unique space-separated co-occurring words in the received query and the selected query;
   identifying a total number of unique space-separated words in both the received query and the selected query;
   calculating a quotient of the number of unique space-separated co-occurring words and the total number of unique space-separated words in both queries; and
   calculating a difference between the numerical value one ("1") and the calculated quotient.

16. The method of claim 1 wherein calculating a score comprises identifying whether a digit is unique to the received query or a selected query from the candidate set.

17. The method of claim 1 wherein calculating a score comprises:
   identifying a number of co-occurring Japanese Kanji characters in the received query and a selected query from the candidate set;
   identifying a total number of unique Japanese Kanji characters in the received query and the selected query from the candidate set;

calculating a quotient of the number of co-occurring Japanese Kanji characters and the total number of unique Japanese Kanji characters; and calculating a difference between the numerical value one ("1") and the calculated quotient.

18. The method of claim 1 wherein calculating a score comprises:

converting one or more characters of the received query to Roman characters;

converting one or more characters of a selected query from the candidate set to Roman characters; and calculating a number of Roman characters the received query and the selected query have in common.

19. The method of claim 1 wherein calculating a score comprises identifying whether either the received query or a selected query from the candidate set contain a non-Roman character.

20. The method of claim 1 wherein calculating a score comprises:

converting one or more Japanese Kanji characters of the received query to Japanese Kana characters;

converting one or more Japanese Kanji characters of a selected query from the candidate set to Japanese Kana characters;

removing all non-Japanese characters from the received query and the selected query from the candidate set; and calculating a character edit distance between the received query and the selected query from the candidate set.

21. The method of claim 1 comprising selecting one or more of the queries from the candidate set for distribution.

22. The method of claim 21 wherein selecting one or more of the queries from the candidate set for distribution comprises selecting one or more queries with scores exceeding a given threshold.

23. The method of claim 1 comprising distributing the one or more queries from the candidate set with scores exceeding a given threshold.

24. The method of claim 23 wherein distributing the one or more queries from the candidate set comprises embedding the one or more queries in a web page.

25. A system for identifying one or more queries related to a given query, the system comprising:

a data store comprising a storage medium for storing a searchable query set;

a search engine comprising one or more processing elements for receiving a query written according to one or more writing systems of a language with multiple writing systems, and identifying a candidate set of one or more queries in the data store, the candidate set of queries written according to one or more writing systems of the language with multiple writing systems;

a conversion component comprising one or more processing elements for converting the received query and the one or more queries in the candidate set into one or more written formats;

a similarity component comprising one or more processing elements for calculating a number of common characters in a given candidate query before disagreement with the query received, the similarity component further calculating a number of total common characters between the given candidate query and the query received and calculating a quotient of the frequency with which a selected query from the candidate set follows the received query in one or more query logs and the frequency of the received query in the one or more query logs; and a similarity score component comprising one or more processing elements for calculating a similarity score on the basis of the number of common characters before disagreement, the total number of characters for the one or more queries in the candidate set and the quotient of the frequency with which a selected query from the candidate set follows the received query in one or more query logs and the frequency of the received query in the one or more query logs indicating the similarity of the one or more queries with respect to the received query.

26. The system of claim 25 wherein the search engine receives a query written according to one or more Japanese writing systems.

27. The system of claim 25 wherein the search engine identifies a candidate set comprised of one or more queries related to the received query.

28. The system of claim 27 wherein the search engine searches one or more query logs to identify one or more queries related to the received query.

29. The system of claim 25 wherein the conversion component converts a query into one or more written formats in accordance with one or more writing systems.

30. The system of claim 25 wherein the similarity component calculates a score indicating the similarity in meaning of a selected query from the candidate set with respect to the received query.

31. The system of claim 25 wherein the similarity component calculates a character edit distance between the received query and a selected query from the candidate set.

32. The system of claim 25 wherein the similarity component:

identifies a number of unique space-separated co-occurring words in the received query and the selected query;

identifies a total number of unique space-separated words in both the received query and the selected query;

calculates a quotient of the number of unique space-separated co-occurring words and the total number of unique space-separated words in both queries; and calculates a difference between the numerical value one ("1") and the calculated quotient.

33. The system of claim 25 wherein the similarity component identifies whether a digit is unique to the received query or a selected query from the candidate set.

34. The system of claim 25 wherein the similarity component:

identifies a number of co-occurring Japanese Kanji characters in the received query and a selected query from the candidate set;

identifies a total number of unique Japanese Kanji characters in the received query and the selected query from the candidate set;

calculates a quotient of the number of co-occurring Japanese Kanji characters and the total number of unique Japanese Kanji characters; and calculates a difference between the numerical value one ("1") and the calculated quotient.

35. The system of claim 25 wherein the similarity component calculates a number of characters the received query and a selected query from the candidate set have in common.

36. The system of claim 25 wherein the similarity component identifies whether the received query or a selected query from the candidate set contain one or more characters of a given writing system.

* * * * *